Figure 1:
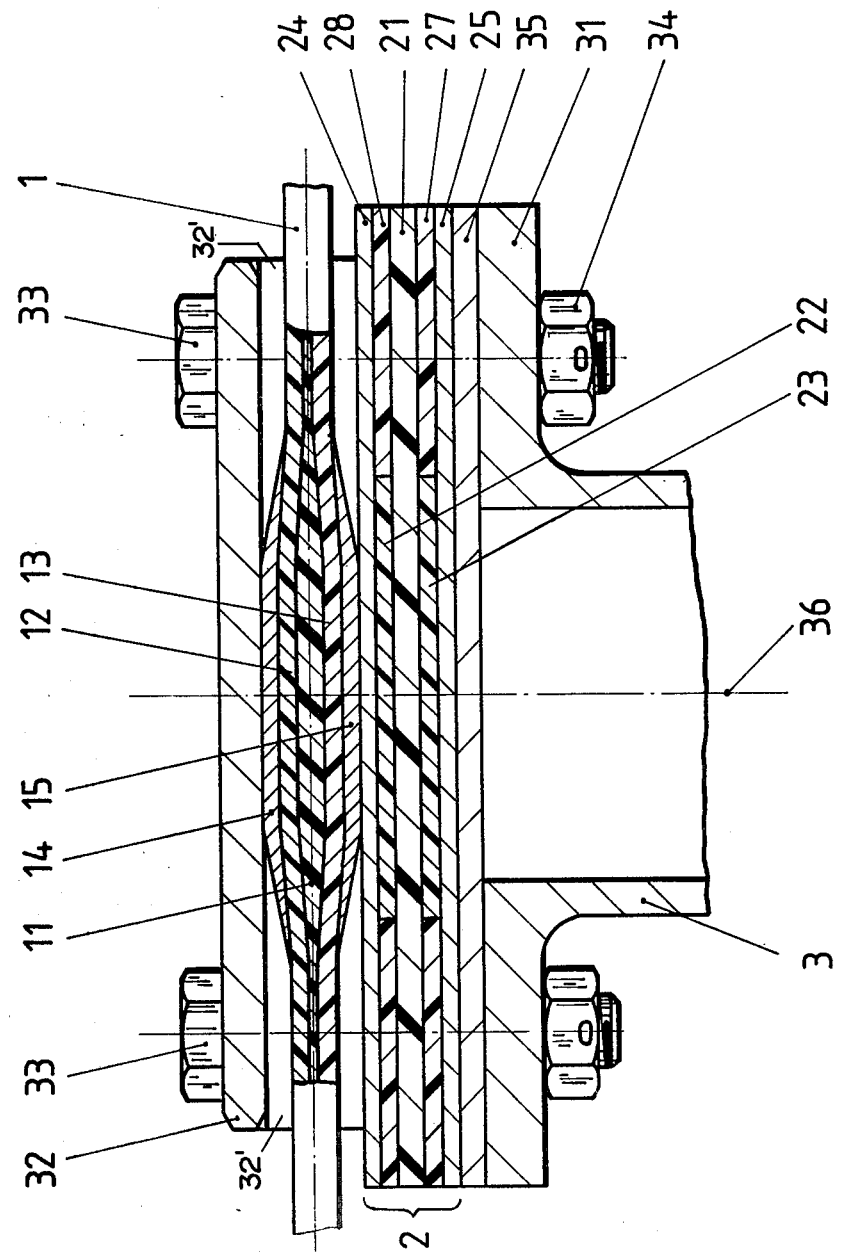

United States Patent [19]

Brunsch et al.

[11] 4,369,018
[45] Jan. 18, 1983

[54] ROTOR HEAD STRUCTURE WITH STACKED CONNECTING ELEMENTS, ESPECIALLY FOR A HELICOPTER

[75] Inventors: Klaus Brunsch, Weidach; Franz Nowak, Taufkirchen, both of Fed. Rep. of Germany

[73] Assignee: Messerschmitt-Boelkow-Blohm GmbH, Munich, Fed. Rep. of Germany

[21] Appl. No.: 166,034

[22] Filed: Jul. 7, 1980

[30] Foreign Application Priority Data

Jul. 24, 1979 [DE] Fed. Rep. of Germany ....... 2929906

[51] Int. Cl.³ ............................................. B64C 27/38
[52] U.S. Cl. .................................. 416/134 A; 416/141
[58] Field of Search .......... 416/134 A, 138 A, 140 A, 416/141

[56] References Cited

U.S. PATENT DOCUMENTS

| 3,874,815 | 4/1975 | Baskin | 416/134 A |
|---|---|---|---|
| 3,999,887 | 12/1976 | McGuire | 416/141 X |
| 4,008,980 | 2/1977 | Noehren et al. | 416/134 A |
| 4,047,839 | 9/1977 | Ferris et al. | 416/141 X |
| 4,053,258 | 10/1977 | Mouille | 416/134 A |
| 4,093,400 | 6/1978 | Rybicki | 416/134 A X |
| 4,104,003 | 8/1978 | Mouille | 416/134 A X |
| 4,293,277 | 10/1981 | Aubry | 416/134 A |

Primary Examiner—Everette A. Powell, Jr.
Attorney, Agent, or Firm—W. G. Fasse; D. F. Gould

[57] ABSTRACT

The wings of a hingeless helicopter rotor are secured to the head of the rotor by connecting elements of fiber compound materials. Each connecting element has at least two outer layers of fiber compound materials and an intermediate layer of $\pm\beta$-fiber compound materials between the outer layers. The intermediate layer is bonded to the outer layers by a suitable adhesive. The intermediate layer takes up the central portion of the securing flange of the rotor head and its axial thickness increases radially inwardly. The intermediate layer has four side lobes which extend laterally out of the confines of the outer layers. These side lobes are connected by bolts to the rotor head. This structure provides a strong connection in which the outer layers are not weakened. Effects of the lead-lag movement of the rotor wings and of any torsion of the connecting elements are minimized and the fictitious hinges are located close to the rotational axis even within the zone defined by the rotor head flange.

8 Claims, 3 Drawing Figures

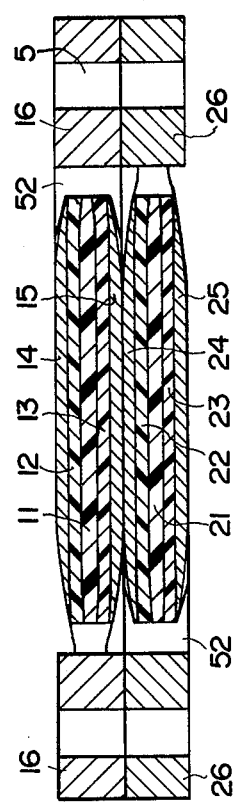

ROTOR HEAD STRUCTURE WITH STACKED CONNECTING ELEMENTS, ESPECIALLY FOR A HELICOPTER

BACKGROUND OF THE INVENTION

The invention relates to a rotor head structure for securing stacked connecting elements, which are arranged in the stack in a cross-over relationship for interconnecting two opposite rotor blades or wings to form a structural unit. More specifically, the invention relates to a rotor head structure with stacked connecting elements which are secured by means of a connecting flange to the rotor mast and which are arranged between the flange and a holding member. Each connecting element comprises layers of fibers arranged uni-directionally.

Two and four blade or wing helicopter rotors are known in the art in which the wing elements arranged opposite each other are interconnected by a leaf spring type connecting element. The connecting element comprises a layered or laminate body in which the layers are made of uni-directionally arranged fibers. The fibers are anchored in the blade roots of the rotor blades or wings. The laminate body of the connecting structure is subject to a leaf spring effect, whereby the stiffness in the flapping direction is small. This small stiffness is even enhanced by a flexible securing of the rotor head to the rotor mast. Thus, it is possible to perform the blade angle movements by means of control levers formed as an integral part of the blade root zone. In the structure of a four blade rotor the connecting elements are arranged in a stack at right angles one above the other, whereby the individual connecting elements are anchored to each other and to the rotor mast by means of diagonally extending layers of uni-directionally arranged fibers resulting in an elastic anchoring. Such a structure is disclosed in U.S. Pat. No. 3,880,551.

The prior art structure has the disadvantage, that the required hinge effect must be carried out partially by the means connecting the structure to the mast because this results in high wear and tear. Additionally, the stiffness of the connecting elements in the lead-lag direction and in the direction of torsional movements is relatively large. Besides, the elastical clamping of the connecting elements is rather involved and hence expensive as far as it can be realized at all in practice.

OBJECTS OF THE INVENTION

In view of the above it is the aim of the invention to achieve the following objects singly or in combination:

to construct a rotor head with stacked connecting elements for the rotor wings or blades in such a manner that the connection of the connecting elements to the rotor mast is simplified and the wear and tear is minimized;

to assure a sufficiently large connection surface of the connecting elements and to avoid weakening the cross sectional area of the connecting elements;

to minimize the effects of the lead-lag movement and of the flapping movement of the rotor blades and to also minimize the effect of any torsion on the connecting elements;

to locate the ficticious hinges very close to the rotational axis even within a zone defined by the surface of the connecting flange which secures the rotor head to the rotor mast;

to introduce the drive torque moment of the rotor shaft or mast into a relatively large surface of the rotor head; and to extend the clamping bolts for securing the rotor head structure to the rotor mast or shaft through lobes of auxiliary connecting elements rather than through the connecting elements themselves, thereby avoiding a reduction of the effective cross-sectional area of the connecting elements.

SUMMARY OF THE INVENTION

According to the invention there is provided a rotor head structure with stacked connecting elements, especially for a helicopter, in which each connecting element between two opposite rotor blades or wings comprises at least two layers of uni-directionally arranged fibers, said layers forming outer layers. A $\pm\beta$-fiber compound layer is arranged between the outer layers as an intermediate layer. The thickness of the intermediate layer is increased within the zone or surface of the connecting flange between the mast and the rotor head so that the edges of the intermediate layer taper outwardly from the rotor axis. The intermediate layer is bonded by an adhesive to the outer layers. The intermediate layer extends laterally beyond the outer layers with its increased thickness in the central zone of the surface of the connecting flange to form lateral lobes extending substantially perpendicularly to the direction of the uni-directionally arranged fibers, said lobes extending on both sides laterally outwardly from the respective connecting elements. These lobes extend substantially in parallel to the sides of the connecting elements and are spaced from the sides of the connecting elements. The lobes are secured to the rotor flange and to a connecting member or cover.

In this context a $\pm\beta$-fiber compound layer means a material composed of fiber layers, wherein the fibers of each layer or the fibers in adjacent layers, extend in directions which enclose with the null line of the angle $\beta$. Thus, the fibers in each layer or the fibers in adjacent layers are arranged in a crosswise disposition.

The thickening of the $\pm\beta$ layer within the central zone above the connecting flange results in increasing the entire height of the connecting element in the axial direction within the connecting zone, whereby the stiffness of the arrangement in the flapping direction is substantially increased. Additionally, this structure makes sure that the ficticious hinge is located very close to the rotor axis within the surface of the connecting or securing flange. Due to the fact that the lobes or ear type parallel sections extend laterally outwardly relative to the corresponding connecting element, the entire connecting surface of the connecting elements is increased. However, this surface is substantially kept free of the effects resulting from the flapping and lead-lag movement and possibly also of the effects of any torsion loads due to the spacing between the lobes and the adjacent edge of the respective connecting element. Another advantage is seen in that the clamping devices such as bolts are located outside the connecting elements proper, whereby the bolts do not have to extend through the connecting elements and it becomes unnecessary to impair the capability of the uni-directional fiber layers for transmitting the centrifugal forces since no bores extend through the uni-directional fiber layers.

BRIEF FIGURE DESCRIPTION

Figure 2:
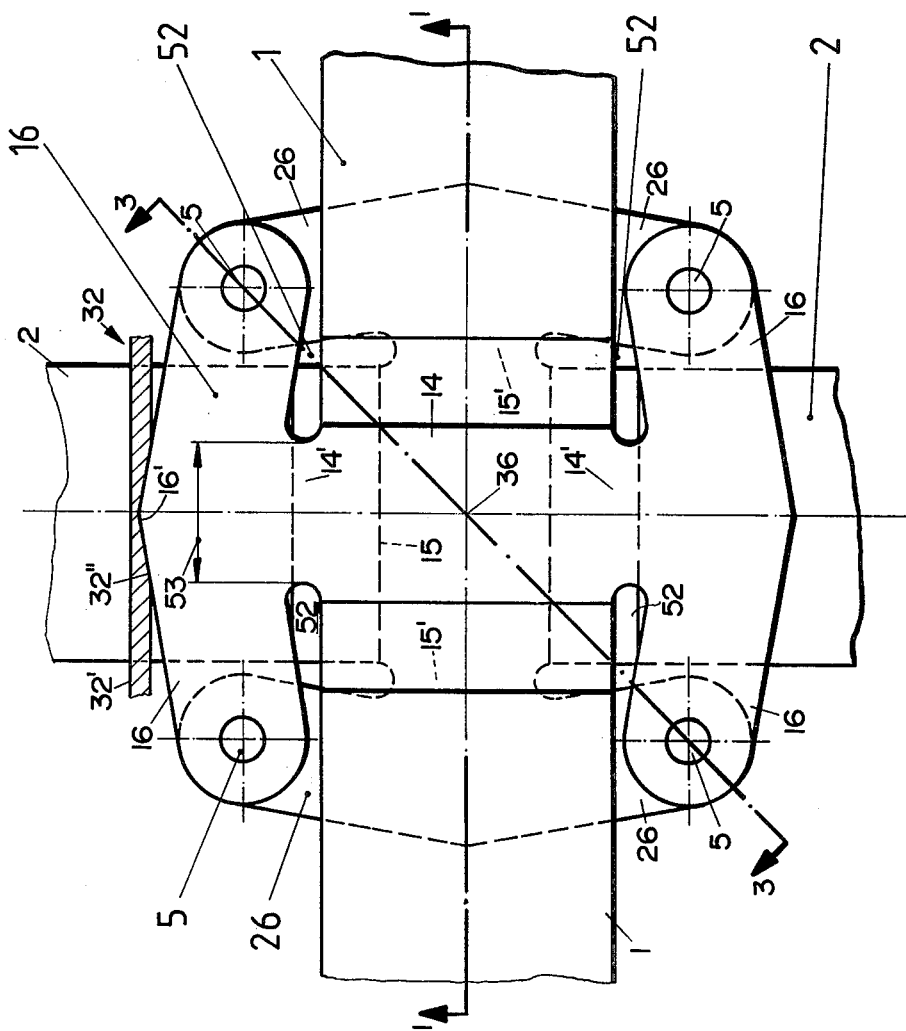

In order that the invention may be clearly understood, it will now be described, by way of example, with reference to the accompanying drawings, wherein:

FIG. 1 is a sectional view through a rotor head structure according to the invention along section line 1—1 in FIG. 2; and FIG. 2 is a top plan view onto the embodiment of FIG. 1 with the upper holding member merely shown partially and with the securing flange not shown for simplicity's sake; and FIG. 3 is a sectional view along section line 3—3 in FIG. 2.

DETAILED DESCRIPTION OF A PREFERRED EXAMPLE EMBODIMENT AND OF THE BEST MODE OF THE INVENTION:

FIGS. 1 and 2 show a structure for securing the connecting elements 1 and 2 which are stacked and cross each other. The connecting elements are arranged in pairs and interconnect two rotor wings or blades arranged diametrically opposite each other to form a unitary structure. The blades are not shown. The connecting elements function as a flapping hinge and as a lead-lag hinge. Additionally, the connecting elements make it possible to take up the torsion resulting from the blade angle adjustment. Such connecting elements for a bearingless, or rather, hingeless rotor, are disclosed, for example, in German Patent Publication No. P 2,917,301.1.

The rotor mast 3 has at its upper free end a securing flange 31 which is preferably covered by a metal plate 35. A holding member or cover 32 cooperates with the flange 31 and with securing bolts 33 as well as nuts 34 in clamping the rotor head structure to the flange 31 and thus to the rotor mast 3. The cover or holding member 32 is laterally opened so that the connecting elements 1 and 2 may extend radially outwardly. The bolts 33 extend through respective bores in the cover and in the flange for cooperation with the nuts 34.

The connecting element 1 which interconnects the top set of rotor blades in FIG. 1 comprises two layers 12 and 13 of fibers arranged in a uniform direction. These layers 12 and 13 form outer layers. A $\pm \beta$-fiber compound layer 11 forming an intermediate layer is arranged between the outer layers 12 and 13. The structure of the $\pm \beta$-fiber compound layer 11 has been described in more detail above in the summary. The outer fiber layers 12 and 13 are bonded to the intermediate $\pm \beta$ fiber layer 11 by means of a suitable adhesive such as the epoxy aadhesive FM123 of American Cyanamid, Co., Havre de Grace, Wilmington, Del. The $\pm \beta$-fiber compound layer 11 is thicker within the zone above the flange 31 and substantially defined by the outer diameter of the rotor mast. Thus, the intermediate layer 11 tapers radially outwardly. Due to this thicker central zone of the intermediate layer 11 the outer layers 12 and 13 are bulged axially outwardly, whereby the entire axial width or height of the connecting elements is increased within the connecting zone. This feature in turn increases the stiffness of the connecting element in the flapping direction. On top of the upper fiber layer 12 there is located a support or bearing layer 14 which tapers radially outwardly. Below the lower outer layer 13 there is arranged a support or bearing layer 15 which also tapers radially outwardly. Both support or bearing layers 14, 15 are made of $\pm \beta$-fiber compound material.

Incidentally, a section through FIG. 1 extending perpendicularly to the plane defined by the sheet of the drawing of FIG. 1 would look exactly as FIG. 1 except that the tapering would appear in the lower set of elements interconnecting the lower pair of rotor wings or blades, rather than in the upper set as shown.

FIG. 2 shows a top plan view of FIG. 1, however, with the flange member 31 and the clamping bolts 33 omitted. Thus, the top member shown in FIG. 2 is the support or bearing member 14. According to the invention the support or bearing member 14 extends laterally beyond the edges of the connecting element 1. These extensions 14' have a length 53 in the longitudinal direction of the connecting element 1. Each extension 14' forms a land or bridge between the support or bearing member 14 and two lobes 16 as best seen in FIG. 2. The length 53 of the lands or bridges 14' corresponds substantially to the width of the member 14 in the longitudinal direction of the connecting element 1 and thus to the contact zone. The lobes 16 extend substantially in parallel to the longitudinal direction of the connecting element 1 and are shaped so as to leave a space 52 between the adjacent edge of the connecting element 1 and the respective lobe or ear type section. Each spacing 52 is so dimensioned that it is sufficient to prevent a contact between the respective lobe 16 and the next adjacent edge of the connecting element 1 under all operating conditions and independently of the deformation of the connecting element 1 which may be caused by the respective operating condition of the connecting element 1. Each ear shaped lobe 16 is provided with a bore 5 which registers with a corresponding bore in the respective lobe 26 of the support or bearing member 15 which is also provided with respective lands or bridges 15' to its lobes 26. The clamping bolts 33 extend through the bores 5.

The thickened zone of the $\pm \beta$-fiber compound layer 11 is constructed in the same manner as the bearing or support members 14 and 15. Stated differently, the lateral edges of the thickened portion of the layer 11 also extend outside of the edges of the connecting element 1 and these extensions of the layer 11 coincide in FIG. 2 with the lobes 16 of the support or bearing member 14. Further, the bearing or support member 15 facing the connecting element 2, please see FIG. 1, has the same shape as that of the support or bearing member 14. In order to maintain the just described elements at the proper level, filler layers are inserted between the elements or sections where they extend in parallel. These filler layers are shown at 27 and 28 for the connecting element 2. However, the filler layers for the connecting element 1 are not visible in FIG. 1 because they are located in front of and behind the plane defined by the sheet on which FIG. 1 is shown.

The connecting element 2 is constructed in the same manner as described above with reference to the connecting element 1 and the connecting elements 1 and 2 are arranged perpendicularly to each other in a cross over relationship as best seen in FIG. 2. As shown in FIG. 1 the connecting element 2 has a central $\pm \beta$-fiber compound layer 21 which is arranged intermediate the two uni-directional fiber layers 22 and 23 and bonded thereto by a suitable adhesive as mentioned above. An upper support or bearing member 24 is arranged above the fiber layer 22. A lower support or bearing member 25 is arranged below the lower fiber layer 23. The support or bearing members 24 and 25 are also made of $\pm \beta$-fiber compound material.

The reinforced central portion of the intermediate ±β-fiber compound layer 21 as well as the support or bearing members 24 and 25 are shaped in the same manner as described above so that the lobes 26 are formed. Thus, the intermediate ±β-fiber compound layer 1, the members 24 and 25, and the members 14 and 15, as well as 11, all have the same lobed top plan view. By inserting the filler layers 27 and 28 and by providing an adhesive bond with the adjacent layers an elevational compensation is achieved to keep the respective elements at their proper elevation within the stack of the connecting elements 1 and 2.

The filler layers 27 and 28 may be made of layers of a webbing material which may, for example, also be a ±β-fiber compound material. Since the connecting elements 1 and 2 are arranged in a cross over manner relative to each other, the parallel lobed sections 16 and 26 also extend in parallel to each other and in a cross over relationship, whereby the orientation is such that the bores 5 of the respective lobes register with each other so that the bolts 33 may freely pass through these bores 5. The contact zone of the connecting elements is located in the illustrated arrangement within the longitudinal extension 53 and within the zone of the lobed sections 16 and 26 of the bearing supports 24 and 25 and of the ±β-fiber compound layers 21 or the support or bearing members 14 and 15 and the ±β-fiber compound layer 11. The rotational axis 36 of the rotor mast 3 extends perpendicularly to the plane of the drawing of FIG. 2.

The transition zone or bridge 14', 15' having the length 53 between the respective connecting element and the corresponding lobed section is relatively small, or rather, relatively short. As a result, the length along which the longitudinal extension of the uni-directional fiber layers is impeded, is also small. The longitudinal extension or stretching of the uni-directional fiber layers is due to the centrifugal force during rotation. The lobed sections 16, 26 impede such stretching because they are rigidly connected with the flange 31 through the bolts 33 and with the respective connecting elements through the bridges 14', 15'. However, such impeding is minimized because said length is relatively short as stated. This feature has the advantage that the shearing loads occurring in the bridging zone is within a range permissible for the materials normally used to make these lobed sections.

Providing the support or bearing members 14, 15 and 24, 25 which are made of ±β-fiber compound layer has the advantage that the bonding surface between the ±β-fiber compound layer and the uni-directional layers 12, 13 and 22, 23 is doubled, whereby the rotational drive moment or torque of the rotor shaft 3 may be introduced into the rotor head through a relatively large surface area.

The filler layers 27, 28 have the advantage that the respective layers are maintained at the desired level in the stack by the level compensation provided by the filler layers to keep the respective sections in parallel to one another.

The spacing 52 between the lobed sections 16, 26 and the adjacent connecting elements 1, 2, makes it possible to deform the connecting elements 1 and 2 in a zone quite close to the rotor axis 36 without influencing the large connecting zone or surface area by such deformations.

By providing the bores 5 as described it is possible to clamp the rotor head with simple means such as the flange 31 and the holding member 32 with the bolts 33, whereby the several sections of a four winged rotor extend perpendicularly in a crosswise relation relative to each other and whereby the bores 5 for the bolts 33 register with one another at each corner of the arrangement. Thus, it is avoided to extend the connecting or clamping bolts 33 directly through the connecting elements, thereby also avoiding reducing the cross sectional area of the connecting elements.

The outer edges of the lobed sections 16, 26 contact the securing flange 31 and the holding member 32 in a form locking manner. This feature has the advantage that the force introduction takes place over an increased surface area. For example, the outer edges of the lobed sections 16, 26 extending substantially in parallel to the respective connecting element 1, 2 may be fitted into respective recesses of the connecting flange 31 or the holding member 32. In any event, the holding member 32 and the flange 31 are rigidly interconnected by the bolt 33 as described.

Referring again to FIG. 2, the clamping cover 32 is shown only partially in FIG. 2 to avoid making the illustration too complicated. The cover 32 has side walls 32' provided with a recess 32'' into which an outer edge 16' of the lobed sections 16 extends in a form-locking, force transmitting manner. All outer edges of the lobed sections are thus secured. For this purpose the securing flange 31 may also have side walls with recesses corresponding to the recesses 32'' for engaging the outer edge of the respective lobed section. The flange 31 and the cover 32 may thus form substantially mirror-symmetrical shell elements between which the various layers are securely held.

In view of the above description of FIGS. 1 and 2, the showing of FIG. 3 is self-explanatory.

Although the invention has been described with reference to specific example embodiments, it is to be understood, that it is intended to cover all modifications and equivalents within the scope of the appended claims.

What is claimed is:

1. A rotor head structure, especially for a helicopter having a drive shaft with a connecting flange, wherein diametrically opposite rotor blades are operatively interconnected by connecting elements of uni-directional fiber layers, wherein each connecting element (1, 2) comprises at least two uni-directional fiber layers (12, 13; 22, 23) and an intermediate ±β-fiber compound material layer (11, 21) interposed between said uni-directional fiber layers and adhesively bonded thereto, each of said intermediate layers (11, 12) having a radially inwardly increasing thickness portion, each of said intermediate layers comprising two lobed sections (16, 26) at each end and bridging means (14', 15') connecting the lobed sections to the increased thickness portion of the respective intermediate layer laterally outwardly on both sides of the respective connecting element, each of said intermediate layers thus forming a configuration resembling a cross-section similar to that of an I-beam, said intermediate layers being arranged in a cross-over relationship so that the lobed sections extend outwardly and substantially in parallel to the longitudinal edge of the respective connecting element for increasing the cooperating connecting surfaces, said bridging means providing a spacing (52) between the respective lobed section and the adjacent edge of the connecting element, said rotor head structure further comprising connecting cover means (32) and clamping means (33, 34)

operatively extending through said lobed sections outside said uni-directional fiber layers for securing said lobed sections to said connecting flange (31), whereby a reduction of the cross-sectional area of the uni-directional fiber layers by the clamping means is avoided.

2. The rotor head structure of claim 1, further comprising support means (14, 15; 24, 25) for at least one of said uni-directional fiber layers (12, 13; 22, 23), said support means comprising a $\pm\beta$-fiber compound layer adhesively bonded to the respective fiber layers, said support means having a substantially uniform thickness in the central zone thereof and ends extending laterally outwardly on both sides of the respective connecting element and substantially perpendicularly to the longitudinal fiber direction, said support means having two lobed sections at each end, said lobed sections extending substantially in parallel to the respective longitudinal edge of the connecting element and with a spacing between the lobed section and the respective longitudinal edge of the connecting element, said lobed sections of the support means also being operatively secured to said connecting flange by said clamping means.

3. The rotor head structure of claim 1, further comprising filler layer means (27, 28) of $\pm\beta$-fiber compound material located at the level of said uni-directional fiber layers (12, 13; 22, 23) on both sides of the intermediate layer in zones free of said unidirectional fiber layers.

4. The rotor head structure of claim 1, wherein said spacing (52) between each lobed section (16, 26) and the adjacent edge of the corresponding connecting element (1, 2) is sufficient to keep said lobed sections from contacting said connecting element under all operating conditions.

5. The rotor head of claim 1, wherein each of said lobed sections comprises a bore for receiving said clamping means.

6. The rotor head structure of claim 1, wherein said connecting flange and said connecting cover means engage the outer edges of said lobed sections in a form-locking, force transmitting manner.

7. The rotor head of claim 6, wherein said connecting flange and said connecting cover means comprise respective recess means into which said lobed sections engage in a form-locking, force transmitting manner.

8. The rotor head structure of claim 1, wherein said intermediate layer (11, 21) is located with its increased thickness within a zone defined by the surface of the connecting flange (31), and wherein said bridging means extend substantially at right angles relative to the uni-directional extension of the fibers of said fiber layers (12, 13; 22, 23).

* * * * *